Re. 24331

Oct. 4, 1955      J. PROSKE      2,719,758

TREAD UNIT STRUCTURE

Filed June 22, 1953      2 Sheets-Sheet 1

*INVENTOR.*
JOSEPH PROSKE
BY *Parker & Carter*

ATTORNEYS

Oct. 4, 1955 — J. PROSKE — 2,719,758
TREAD UNIT STRUCTURE
Filed June 22, 1953 — 2 Sheets-Sheet 2
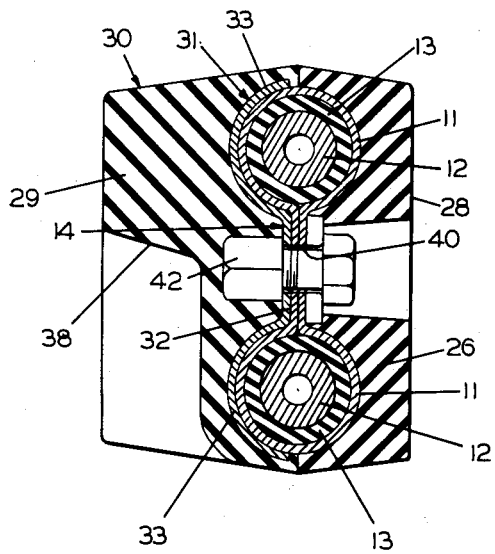
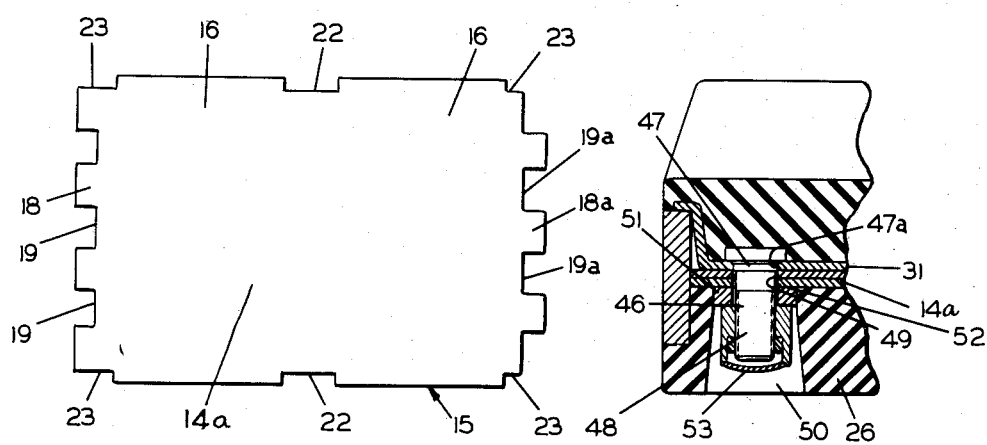
INVENTOR.
JOSEPH PROSKE
BY Parker & Carter
ATTORNEYS

1

2,719,758

TREAD UNIT STRUCTURE

Joseph Proske, Geneva, Ill., assignor to Burgess-Norton Mfg. Co., Geneva, Ill., a corporation of Illinois Application June 22, 1953, Serial No. 363,135

2 Claims. (Cl. 305—10)

This invention relates to improvements in tread units for endless tracks of a military vehicle or the like and, more particularly, to tread units having all-rubber top and bottom faces for engagement with the ground.

Among the objects of the present invention is to provide an improved and more economical form of tread unit frame of the type broadly disclosed in the copending application bearing Serial Number 393,721 and filed November 23, 1953, but wherein the tread unit includes a detachable rubber-bottomed shoe having improved means for rigidly connecting the shoe to the frame so as to permit replacement of the shoe when its rubber ground-engaging face becomes excessively worn, without requiring detachment of the tread unit from the endless track.

A further object of the invention is to provide an improved means for detachably securing the removable shoe to the frame.

Other objects and advantages of the invention will appear from time to time as the following description proceeds.

The invention may best be understood by reference to the accompanying drawings, in which:

Figure 3 is a section taken on line III—III of Figure 1;

Figure 4 is a face view of a blank from which portions of the tread unit frame are formed;

Figure 5 is a section taken on line V—V of Figure 4.

Figure 1:
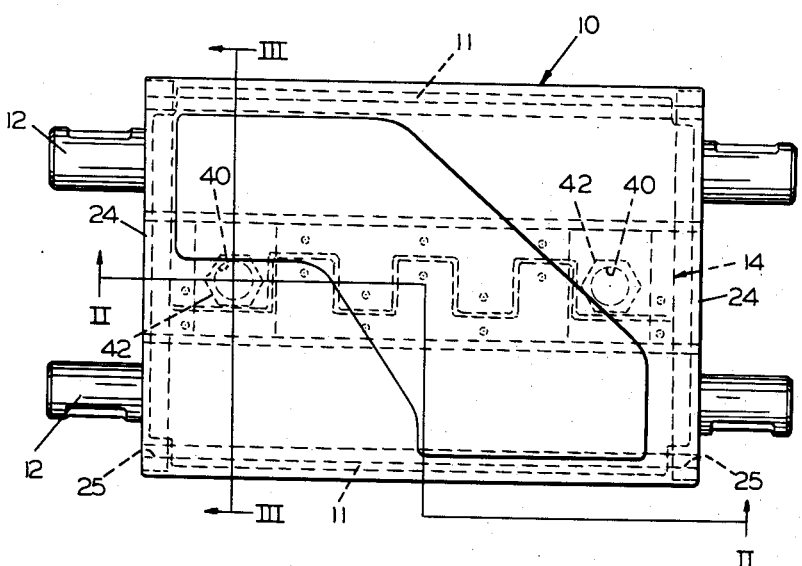
Figure 1 is a bottom view of a tread unit constructed in accordance with my invention.
Figure 2:
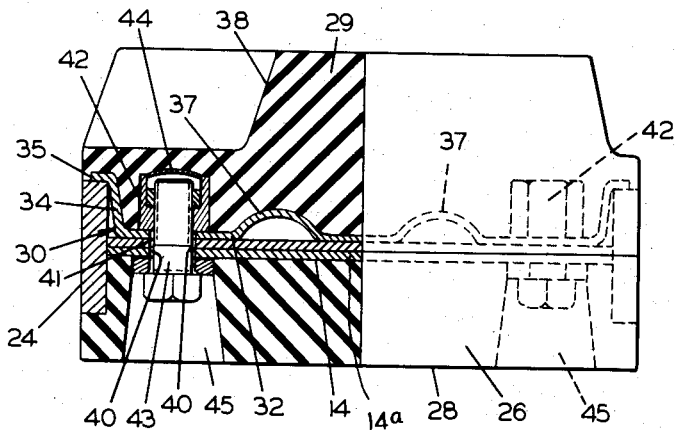
Figure 2 is a section taken on line II—II of Figure 1.

Referring now to the embodiment of the invention illustrated in Figures 1 to 3 of the drawings, inclusive, Figure 1 shows a tread unit, indicated generally at 10, in the form in which it is adapted to be employed by insertion in a single-strand endless track. Said tread unit has a metal frame including a pair of parallel spaced tubularly formed pivot bearing sleeves 11, 11 extending transversely of the track proper, and arranged as usual for the insertion of pivot pins 12, 12 supported in resilient rubber bushings 13, 13 to provide the desired amount of pivotal movement of the pins relative to the tread unit, as well as to adjacent tread units in the strand.

The outer ends of the pivot pins 12 project beyond the opposite ends of the tread unit and are adapted to be connected by relatively short connectors of well-known form to join similar pairs of pivot pins of adjacent tread units in short-coupled relationship. It will be understood that the form of tread block shown in Figure 1 has relatively short pivot pins designed for use in a single-strand endless track but that the pivot pins may be longer to accommodate two similar tread units in side-by-side relation for a double-strand endless track. In either case, the pivot pins 12, the resilient rubber bushings 13, and the connectors for the ends of the pivot pins may be of well-known construction, forming no part of the present invention so need not be further shown or described herein.

Referring now more particularly to the metal frame of the tread unit, the frame shown for illustrative purposes herein is of the same construction as disclosed in the co-

2 pending application, Serial Number 393,721, above referred to, wherein the tubular pivot sleeves 11, 11 and a central connecting web, indicated generally at 14, are formed of a single sheet of metal bent to shape from a blank 15, shown in Figure 4. The blank 15 consists of a generally rectangular piece of sheet metal with similar end portions 16, 16, each of sufficient length to produce the full diameter of one of the pivot sleeves 11, 11 when formed over a mandrel, with terminal flange portions 18, 18a along the outer edge of the blank. One flange portion 18 is formed with a series of notches 19, 19, herein generally rectangular in shape, and arranged to interfit with similar rectangular notches 19a, 19a formed along the edges of the opposite terminal flange portion 18a of the other end of the blank 15, when the two pivot sleeves 11, 11 are completed in substantially circular form.

The notches interfit with each other when the flange portions 18, 18a are in overlapping relation with the adjacent flat central web portion 14a of the blank to close the inner sides of the pivot sleeves 11. The flange portions 18 and 18a are fused as by welding or brazing, or both, to the central web portion 14a, so as to form therewith the single web of double thickness, indicated generally at 14.

The central web 14, consisting of the central web portion 14a and the overlapping flanged portions 18 and 18a, are preferably disposed substantially along the plane coincident with the longitudinal axes of the two pivot sleeves 11, 11.

The central portion of the developed blank 15 is provided with notches 22, 22 along opposite sides thereof of substantially the same length as the space between the finally developed pivot sleeve portions 11. The flange portions 18 and 18a also have notches 23, 23 formed at opposite sides thereof. End bars 24 are finally secured over the opposite ends of the pivot sleeve portions 11, 11 after the latter are formed in tubular shape, with their outer ends projecting through, and fixed in, eyes 25, 25 in the end bars 24, 24, by brazing or welding. The notches 22, 22 and 23, 23 at opposite sides of the plate are of such depth to accommodate the central portions of the end bars. The inner faces of the end bars may be finally welded or brazed to the adjacent ends of the connecting web 14.

When the frame, including the pivot sleeves 11, 11 with their connecting web 14 and end bars 24, is completed, a rubber block 26 is molded to one face of the web and surrounding adjacent half portions of the end bars 24 and pivot sleeves 11, so as to form a flat upper bearing face 28 for engagement by the bogie wheels of the vehicle.

A bottom tread shoe, indicated generally at 30, consists of a metal plate 31 having a rubber tread block 29 molded thereon. Said plate 31 is pressed or otherwise formed with a central trough 32 and parallel channels 33, 33 which are substantially semi-circular in transverse section so that the central trough 32 fits against the lower face of the central web portion 14 of the frame, while the channels 33 conform in shape and fit along the lower edges of the sleeves 11, as shown in Figure 3. The opposite ends of the trough 32 are closed by downwardly and outwardly inclined end walls 34 which terminate in flanges 35, 35 adapted to fit in lapping engagement along adjacent lower faces of the end bars 24. The plate 31 also has shallower transverse slots 37, 37, herein two in number, to stiffen the latter and reduce the amount of rubber necessary for the rubber tread block 29.

The rubber tread block 29 may be formed by molding and vulcanizing the rubber to the under face of plate 31, with a grouser or cleat 38 molded integral therewith. It will be understood that the grousers may be of any suitable pattern or arrangement desired. The rubber tread block 29 is formed in a suitable mold to a parting plane including substantially one-half the pivot sleeves 11 in such a manner that the lower tread block 29 is complementary to the upper tread block when the removable shoe is in assembled relation on the tread unit.

The plate 31 has a pair of centrally disposed apertures 40, 40 in spaced relation near opposite ends of the trough 32 in position to register with fastening holes 41, 41 extending through the central web of the tread unit frame.

One means of detachably securing the plate 31 with its tread block 29 to the frame is shown in Figures 2 and 3, wherein a pair of nuts 42, 42, for reception of fastening bolts 43, 43, are fixed as by welding on the upper face of the plate 31 in registering relation with the apertures 40, 40 in the latter. Said nuts preferably have their outer ends closed by end plates 44, 44 so as to permit the rubber tread block to be molded on the plate 31 with said nuts in place thereon. Said nuts may be of any suitable safety or lock nut type, details of which need not be further described.

The upper tread block 26 has a pair of flared apertures 45, 45 in registering relation with the apertures 40, 40 in the central web 14 so as to permit the insertion of the fastening bolts through said web and into threaded engagement with the nuts 42, 42.

Referring to the variant form of fastening means shown in Figure 5, bolts 46, 46, each having relatively short heads and a polygonal shoulder 47, herein shown as squared, immediately below the head, are fitted in a similarly shaped polygonal aperture 47a formed in the plate 31, with the threaded end 48 of the shoulder projecting through the apertures 49, 49 in the web and extending into recesses 50, 50 molded in the face of the upper rubber block 26. A washer 51, in registering relation with the aperture 47a, is preferably fixed to the upper exposed face 52 of the web 14 as by welding or brazing, and a lock nut 53 of suitable form is fixed to the outer end of the threaded bolt 46, as shown in Figure 5. It will be understood that, in the variant form of fastening means just described, the bolt head is preferably fixed in place in the plate 31 before the tread block 26 is molded on said plate so that the polygonal portion of the bolt will be retained in place in said plate while the nut is being secured and tightened down on the bolt.

Although I have shown and described certain embodiments of my invention, it will be understood that I do not wish to be limited to the exact construction shown and described, but that various changes and modifications may be made without departing from the spirit and scope of the invention as defined in the appended claims.

I claim:

1. In a tread link for endless tracks, a metal frame including a pair of parallel spaced pivot sleeves and a web connecting said sleeves substantially for their full length, said sleeves and web being formed from a continuous blank of sheet metal into a flat central web, cylindrically shaped end portions, and terminal flange portions extending into abutting relation with each other and fused with said flat central web portion to form a composite connecting web of substantially double thickness filling the space between said cylindrically shaped end portions, said composite web being disposed substantially in alignment with the axis of said cylindrically shaped pivot sleeves, and end plates connecting said pivot sleeves together at their opposite ends to form a rigid frame, an upper rubber block permanently molded to one face of said frame to a parting line including substantially one-half of said sleeves, and a detachable tread shoe including a metal plate formed to fit over the opposite face of said frame including upstanding end walls adapted for fitting engagement between the end plates of said frame, said metal plate also having a lower rubber block permanently molded thereon to form a ground-engaging surface, and means for detachably fastening said metal plate to the composite web, said fastening means being accessible through one of said rubber blocks.

2. In a tread link for endless tracks, a metal frame including a pair of parallel spaced pivot sleeves and a web connecting said sleeves substantially for their full length, said sleeves and web being formed from a continuous blank of sheet metal into a flat central web, cylindrically shaped end portions, and terminal flange portions extending into abutting relation with each other and fused with said flat central web portion to form a composite connecting web of substantially double thickness filling the space between said cylindrically shaped end portions, said composite web being disposed substantially in alignment with the axis of said cylindrically shaped pivot sleeves, and end plates connecting said pivot sleeves together at their opposite ends to form a rigid frame, an upper rubber block permanently molded to one face of said frame to a parting line including substantially one-half of said sleeves, and a detachable tread shoe including upstanding end walls adapted for fitting engagement between the end plates of said frame, said metal frame also having circular channels substantially semi-circular in cross section and extending between said end walls, adapted for fitting engagement with the adjacent pivot sleeves of said frame, grouser means permanently connected to the underface of said metal plate to form a ground-engaging surface and means for detachably fastening said metal plate to the composite web, said fastening means being accessible through the upper rubber block.

References Cited in the file of this patent

UNITED STATES PATENTS

| | | |
|---|---|---|
| 2,331,350 | Schonitzer et al. | Oct. 12, 1943 |
| 2,334,196 | Hopkins | Nov. 16, 1943 |
| 2,353,124 | Burgess | July 11, 1944 |